United States Patent [19]

Gensini et al.

[11] Patent Number: 5,239,554
[45] Date of Patent: Aug. 24, 1993

[54] DIRECT-ARC ELECTRIC FURNACE FED WITH CONTROLLED CURRENT AND METHOD TO FEED A DIRECT-ARC FURNACE WITH CONTROLLED CURRENT

[75] Inventors: Gianni Gensini, Buia; Luciano Morello; Giovanni Coassin, both of Pordenone; Ricardo Fragiacomo, Mestre, all of Italy

[73] Assignee: Danieli & C. Officine Meccanichi SpA, Buttrio, Italy

[21] Appl. No.: 612,981

[22] Filed: Nov. 15, 1990

[30] Foreign Application Priority Data

Nov. 30, 1989 [IT] Italy .................. 83520 A/89
Sep. 3, 1990 [EP] European Pat. Off. ........ 90116833.6

[51] Int. Cl.⁵ .......................................... H05B 7/144
[52] U.S. Cl. .................................. 373/102; 373/104; 373/105; 373/106; 373/108
[58] Field of Search ................ 373/102, 104, 105, 106, 373/108, 50; 219/134; 164/470, 266, 509

[56] References Cited

U.S. PATENT DOCUMENTS

| | | | |
|---|---|---|---|
| 2,632,862 | 3/1953 | Stoltz | 314/73 |
| 3,617,595 | 11/1971 | Mulcahy | 373/106 |
| 3,650,311 | 3/1972 | Fritsche | 373/50 |
| 3,952,138 | 4/1976 | Nanjyo et al. | 373/104 |
| 4,461,010 | 7/1984 | Titus | 373/108 |
| 4,586,187 | 4/1986 | Hein et al. | 373/106 |
| 4,607,373 | 8/1986 | Bergman | 373/105 |
| 4,607,374 | 8/1986 | Ingaki et al. | 373/104 |

FOREIGN PATENT DOCUMENTS

| | | |
|---|---|---|
| 0118947 | 9/1984 | European Pat. Off. . |
| 0197329 | 10/1986 | European Pat. Off. . |
| 22117 | 8/1956 | Fed. Rep. of Germany ...... 373/102 |
| 2238006 | 2/1974 | Fed. Rep. of Germany . |
| 3508323 | 9/1985 | Fed. Rep. of Germany . |
| 3733077 | 4/1989 | Fed. Rep. of Germany ...... 373/102 |
| 2266347 | 2/1975 | France . |
| 2457029 | 5/1975 | France . |
| 232692 | 9/1989 | Japan ...................... 373/104 |
| 232693 | 9/1989 | Japan ...................... 373/105 |
| 103891 | 4/1990 | Japan ...................... 373/104 |

Primary Examiner—Bruce A. Reynolds
Assistant Examiner—Tu Hoang
Attorney, Agent, or Firm—Antonelli, Terry, Stout & Kraus

[57] ABSTRACT

Method to feed a three-phase direct-arc electric furnace with controlled current and also a three-phase electric furnace thus fed for the smelting of metals, e.g. iron-based alloys, the furnace comprising means (GI) for regulation of the length of the arc by means of action on the height of the electrodes, the mains supply of the furnace including at least one medium voltage line and a transformer to serve the arc furnace, an element to regulate the arc current being comprised in each phase in the segment connecting the medium voltage line and the transformer and consisting of at least one inductor (L1), a thyristor-controlled valve (T) or alternatively a regulation element consisting of a saturable reactor being included in parallel with at least part of the inductor, one or the other of these regulation elements cooperating with a device (s1) to measure the intensity of the arc current and with an assembly (GC) that controls the arc current of the furnace by means of action on the overall value of the equivalent series reactance. The method includes feeding current to the furnace through the mains supply and varying the value of a series reactance of the segment connecting the medium voltage line and the transformer.

12 Claims, 4 Drawing Sheets

DIRECT-ARC ELECTRIC FURNACE FED WITH CONTROLLED CURRENT AND METHOD TO FEED A DIRECT-ARC FURNACE WITH CONTROLLED CURRENT

BACKGROUND OF THE INVENTION

This invention concerns a three-phase direct-arc electric furnace fed with a controlled current and also a method to feed with controlled current a three-phase direct-arc furnace.

This invention is applied to three-phase electric arc furnaces for the smelting of metals and iron and alloys thereof in particular.

Direct-arc electric furnaces are mainly used at the present time for the smelting and re-smelting of steel and are almost all three-phase furnaces.

During the last twenty years the power of each furnace has increased considerably, passing from unit powers of 16 MW and 20 MVA to powers greater than 85 MW and 120 MVA.

These high powers entail for the supply network great problems of disturbances in the voltage (flicker) as well as considerable phase shifts due to the inductive loads.

To correct the phase differences due to these inductive loads and reduce the voltage fluctuations, the modern compensation technology makes use of variable compensators of reactive power, which are operated with controlled diodes.

The principle of regulation is shown in FIG. 1 and is as follows.

Three inductors are placed in parallel connection with the three-phase medium-voltage line, which is the supply point of the strongly inductive loads of the furnace; these inductors are supplied by means of thyristors T, the firing angle of which is controlled on the basis of the current detected by the device S1.

This regulation system keeps constant and balanced at zero the total reactive power employed by the furnace, the inductors L1 and L2 and the batteries of power-factor corrective capacitors CR, which are all connected to the medium voltage supply line.

The batteries of power-factor corrective capacitors CR with the addition of suitable inductors are made to perform also the function of filtration of the harmonics generated by the furnace and by the compensation system.

Instead, the active power of the furnace arcs is regulated by changing the height of the electrodes by means of suitable hydraulic assemblies GI, by trying to keep the resistances of the arc constant.

To overcome the difficulties and some of the shortcomings which this indirect type of regulation of the absorbed current entails, direct-current furnaces have recently been produced, and with this type there is one single electrode and the return of the current is through the shell of the furnace.

The supply current of the arc is provided by a rectification assembly made of controlled diodes or thyristors. This system involves two substantial drawbacks. On the one hand there is the difficulty of obtaining the return route of the current, while on the other hand there is a strong generation of harmonics of an odd number by the rectification system.

To obviate these serious drawbacks of both types of arc furnace, the present applicant has designed, tested and embodied the present invention, which has as its objective to overcome the problems of the prior art.

SUMMARY OF THE INVENTION

According to the invention the control mechanism acts directly on the arc current of the furnace so as to determine the operating point and reduce disturbances. This is in contrast with the state of the art, which lets the current in the furnace vary freely and be controlled only by the hydraulic system regulating the length of the arc, while the anti-flicker control system thereafter seeks to regularize the situation towards the mains supply side.

Whereas the present three-phase arc furnaces are usually connected to a compensation system which works independently and in parallel connection with the furnace, the three arcs of the furnace according to this invention are fed by imparting to each arc a first basic current restricted by a first inductor L1 according to one embodiment of the invention.

A second current is superimposed on this first current by a second inductor L2; the second current is operated and regulated by means of a thyristor T by a transfer function, which takes into account the operating state of the arc by analysing the value and/or the initial slope or trend of that first basic current.

According to a variant, besides the analysis of this value and/or initial slope, the state of the electrical magnitudes in question at various points in the plant and in particular the position of the tap changer under load of the transformer are also analysed.

According to an embodiment of the invention a saturable reactor RS may be suitably employed instead of the inductors L1 and L2 and thyristor T.

According to the invention, the power-factor corrective capacitors, which also operate as filters for the absorption of the harmonics generated by the furnace in relation to the mains supply network, are placed in parallel connection on the medium voltage bus bar in a manner fully analogous to the one that takes place in the state of the art, but have much lower values of capacity.

BRIEF DESCRIPTION OF THE DRAWINGS

With reference to the attached figures, which are given as a non-restrictive example.

FIG. 2 shows the invention and enables the difference of the invention from the state of the art to be understood, while

DETAILED DESCRIPTION OF THE PREFERRED EMBODIMENTS

The invention differs from the state of the art in the zone between the medium voltage line and the furnace transformer.

Figure 1:
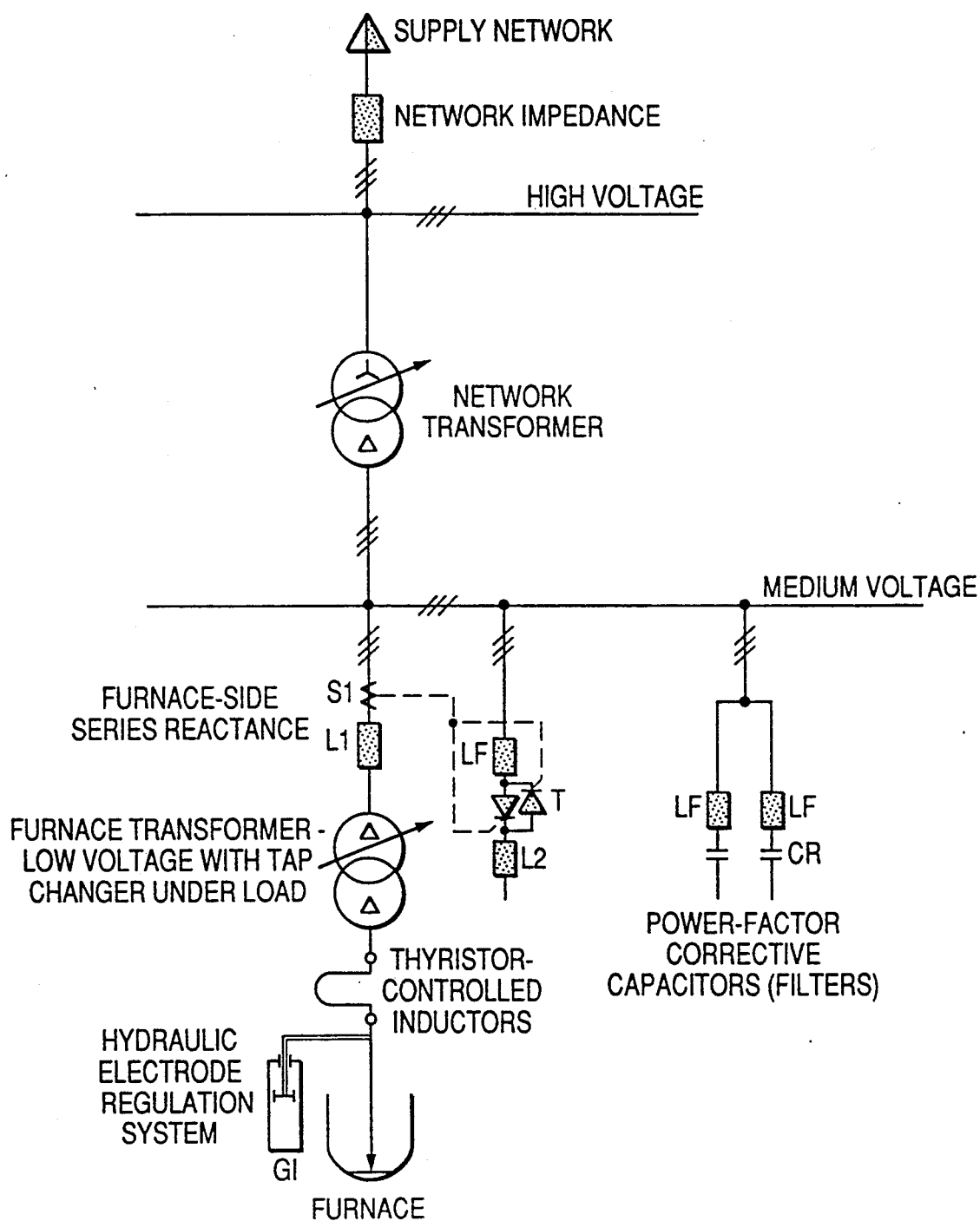
FIG. 1 shows the state of the art.

In FIG. 1 the inductor L1 has the purpose of optimizing and making more flexible by an exact choice of its value the operating point of the furnace with reference to the usable transferred power, to the length of the arc, to the current intensity and to the radiation index.

The value of the inductor L1 is carried out by determining an operating point that balances the contrasting requirement of ensuring an adequate transfer of power and an arc current high enough for the technological requirements of the smelting process and, at the same time, limiting the peaks of current in the event of a short circuit of the electrodes.

The choice of value of the inductance of the inductor L1 affects indirectly the arc heat radiation, which must vary between a minimum value imposed by considerations of efficiency of production and a maximum value imposed by restrictions of the wear on the refractory lining and by observing the relative safety limits.

It is important to compensate the reactive power of an inductive type absorbed by the furnace.

The necessary reactive capacitive compensation power is obtained by connecting in parallel to the medium voltage line a fixed bank of power-factor corrective capacitors CR (usually star-connected with neutral insulated or earthed) and a variable inductance obtained with fixed inductors L2 and a thyristor-operated values T (inductor controlled by thyristors). The connection of the inductors L2 is the triangle connection.

Inductors LF are also provided to act as a filter and are placed in series to the thyristors T and capacitors CR.

The need for a variable compensation is justified not so much by the requirement of obtaining at the supply point an average power factor greater than that imposed by the power supply authority but rather by the possibility of compensating very quickly for the peaks of absorbed reactive power which are responsible for flicker in the supply mains network.

The choice of the values of the capacitance of the bank of capacitors CR and the inductor L2 is carried out according to the maximum reactive power required by the furnace (equal to the furnace short circuit power) corrected by a coefficient greater than 1 due to the incomplete compensation of the described compensation assembly (CR+L2+T).

Inductors LF are also provided which perform filterers and are in series with the thyristors T and capacitors CR.

Measurement of the reactive currents drawn by each supply phase of the furnace is carried out for each phase by a sensor device S1, which generates the feed-back signal of the control system of the arc current.

At all times the capacitive current absorbed by the banks of capacitors CR must be balanced with the inductive currents absorbed by the furnace and by the inductor L2 controlled by the thyristors T.

Figure 2:
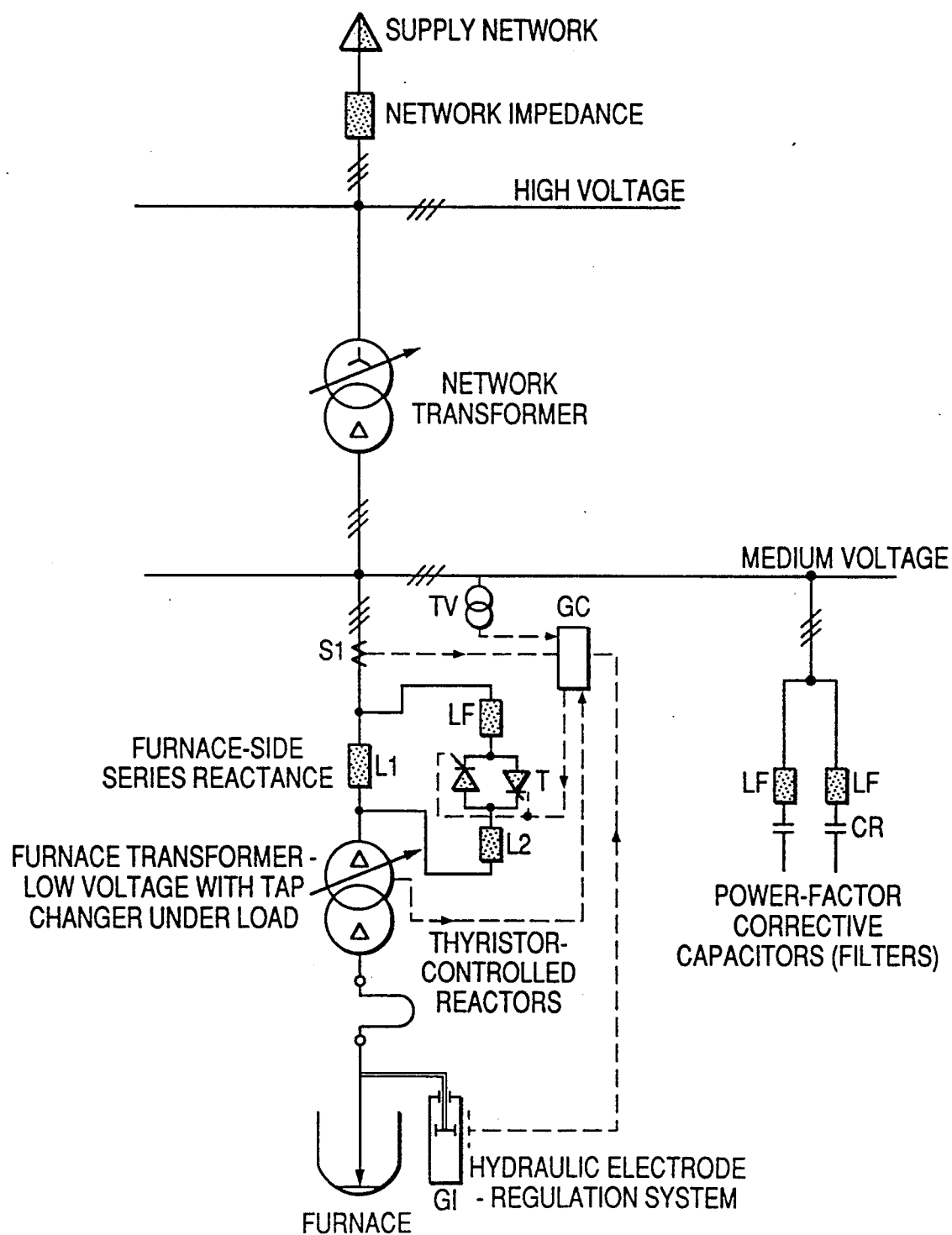

A second regulation device reference with GI in FIG. 2 concerns the geometry of the electric circuit that controls the arc resistance.

Known, servo-mechanisms GI of a hydraulic type, for instance, adequately move the electrodes vertically with the purpose of keeping the impedance of the furnace constant.

Mechanical regulation obviously has time constants distinctly slower than the electrical type regulation described above and is therefore less effective with regard to the effects of electrical disturbances.

With reference to FIG. 2 the inductor L1 performs the same function as the inductor L1 included in the state of the art shown in FIG. 1.

The variable inductor is obtained with a fixed inductor L2 and a thyristor-operated valve T and is positioned in parallel to the inductor L1, thus providing a variable inductance located in series with the furnace mains supply.

The sensor device S1 measures the intensity of the current drawn by the arc and sends signal that drives the control system of the thyristors T.

It is possible in this way to keep the current absorbed by the furnace constant within broad limits and thus obtain a controlled current supply.

Variations in the arc impedance are compensated by opposing variations of impedance of the equivalent inductor placed in series and consisting of the parallel connection of inductor and L2.

If, for instance, the arc tends to die out, the inductance is reduced to increase the flow of current.

If, instead, the electrodes are short-circuited by the scrap being smelted, the inductance of the parallel connected inductor is brought up to the maximum value so as to limit the resulting voltage drop in the supply network. That is to say the invention corrects the cause of the disturbances in the supply network rather than corrects the effects of the disturbance with a static variable compensator as in the state of the art.

The automatic control of the equivalent series inductance depending on the arc current is the innovation of the invention.

The control now illustrated can cooperate also with hydraulic regulation GI of the length of the arc.

Although the two types of control have as their common purpose the maintenance of a constant impedance in the furnace side, they have some differences. The geometric regulation GI which affects the position of the electrodes may change, by acting on the length of the causing only the resistive part of the impedance to vary whereas the electrical regulation of the equivalent series inductance (parallel between L1 and L2) changes the reactive part directly and effecting the arc current acts also on the equivalent resistance.

Moreover, the time constants are very different since in one case actions of a mechanical type are implicated, whereas in the other case merely electrical actions are involved.

Regulation of the equivalent series reactance, being carried out phase by phase, enables also the impedance inherent in the geometry of the secondary circuit of the furnace (from the outputs of the furnace transformer to the arcs) to be corrected and the currents in the three phases to be kept constant, thus overcoming the so-called "cold phase" and "wild phase" problems.

The inductors controlled by means of thyristors T in the state of the art and with the invention are actuated according to the signals coming from the sensor device S1 these which are processed by a control assembly GC.

The control circuit utilized by the invention can also receive signals which reflect variations in other electrical magnitudes in various parts of the circuit. Thus it can receive signals, for instance by means of a transformer TV, of measurement from the medium voltage line; it can receive signals, for instance, of the position of the electrodes through the control GC; it can also receive signals from other sources, for instance the position of the commutator under load of the transformer and other setting signals.

Moreover, the control assembly GC prevents saturation of the inductors by eliminating the continuous component of currents passing through the same.

Power-factor corrective capacitors CR are connected to the medium voltage line and have the task of correcting the power factor of the reactive component of the power absorbed by the furnace within the limits set by the authority which supplies electrical power.

As can be seen in the FIGS. 1 and 2, the configuration according to the invention provides for the same components as those already comprised in the normal configuration, but these components are employed functionally in a different way.

The different use of the components with resulting different dimensioning entails some substantial constructional savings.

The comparison of the state of the art and the invention can be carried out with an equal active power supplied to the furnace and with equal disturbances of a flicker type generated in the supply mains.

The inductor L1, although having a greater reactance in the present invention conducts only part of the operating current of the furnace. Its value as regarding power rating and therefore as is about 30 to 40% of that required in the configuration of FIG. 1 when a safety factor due to short-circuit overloads is taken into account.

The power-factor corrective capacitors CR also have a considerable reduction in value. In fact, in the case of FIG. 1 the reactive capacitive power is dimensioned, as we have already noted, at a greater value than the short-circuit power at the electrodes. In the case of FIG. 2 it is only necessary to correct the power factor of a part of the reactive power absorbed by the furnace at the operating point. The resulting reduction is about 70 to 80%.

The value of the inductor L2, controlled by the control of the thyristors T, could be considered nil at a theoretical level so as to permit the maximum range of regulation of the furnace series reactance.

Technological reasons linked to the smelting process and to the embodiment of the valve T require, if a precautionary factor is used, a reduction of about 80 to 90% as compared to the embodiment of FIG. 1.

The valve T itself, having a power rating according to the invention at lower voltages and less high currents, shows a reduction in power by a factor of about 40 to 50%. This value is obtained by calculating the product of the maximum voltage applied to the valve T multiplied by the maximum current which passes through it.

Besides the constructional savings achieved on the components it is necessary to take into account an improvement in the operational costs with this improvement being due substantially to the reduced electrical variability of the arc.

In fact, the increased stability of the current and its uniformity in the three phases provide a greater efficiency during the production process, less wear of the electrodes and refractory lining and smaller electrodynamic stresses in the event of short circuits.

As a consequence of the invention utilizing the automatic control of the reactance in series with the circuit of the furnace side, it is possible to achieve this control in different ways.

Figure 3A:
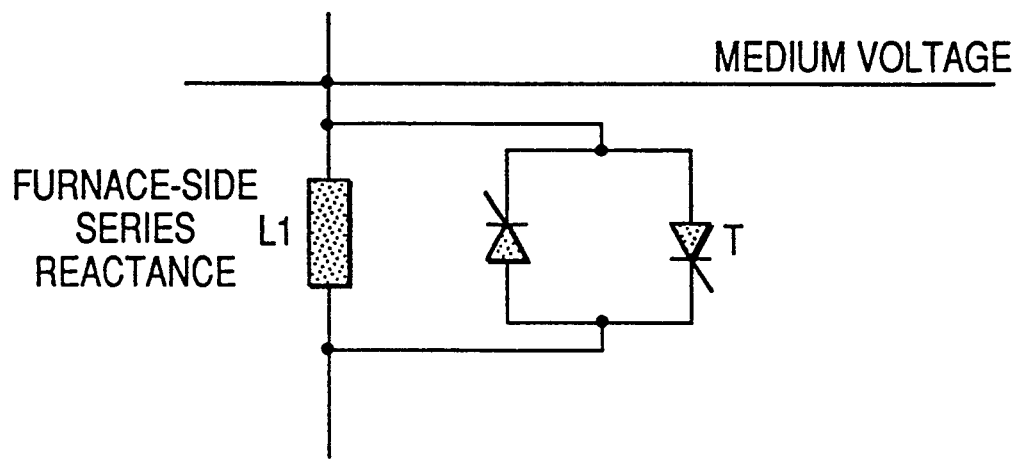
FIGS. 3 and 4 show variants of the idea of the solution.

A first variant shown in FIG. 3a provides for elimination of the inductor L2 but retention of the valve operated by thyristors T; as discussed earlier, the inductor L2 is not substantial and, in fact, is due to technological reasons.

Figure 3B:
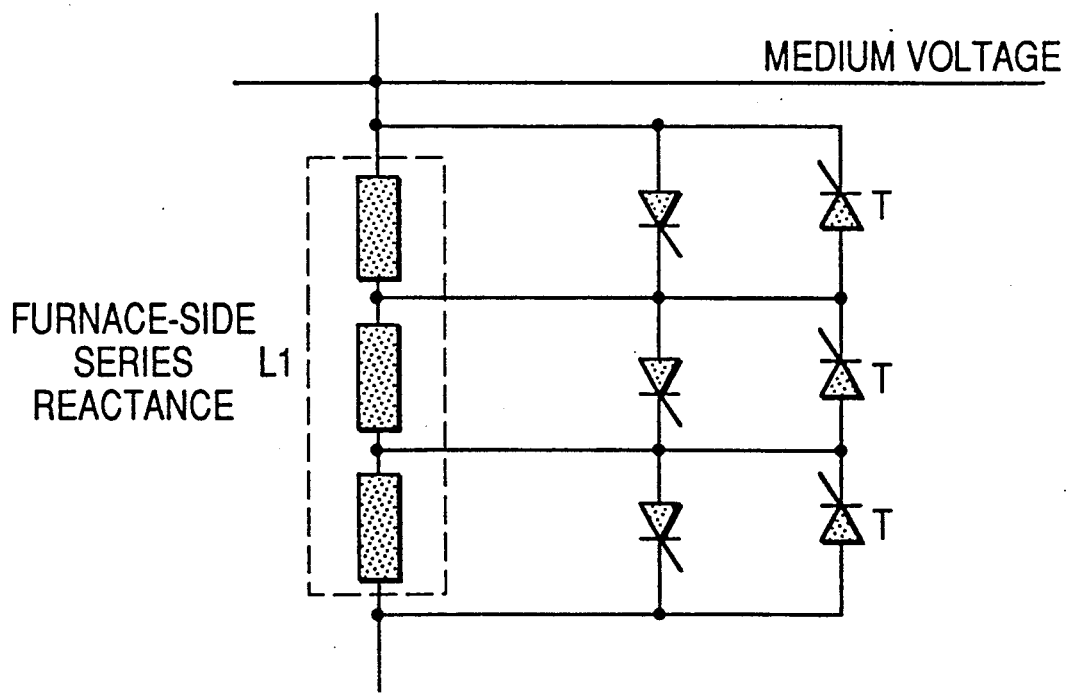

FIG. 3b shows another variant which provides for regulation of a non-continuous type but in steps. From the inductor L1 are branched some intermediate tappings the activation of which is controlled by thyristor-controlled switches. This variant makes a simpler control possible but does not permit fine regulation of the furnace-side impedance and therefore of the phase current.

Figure 4:
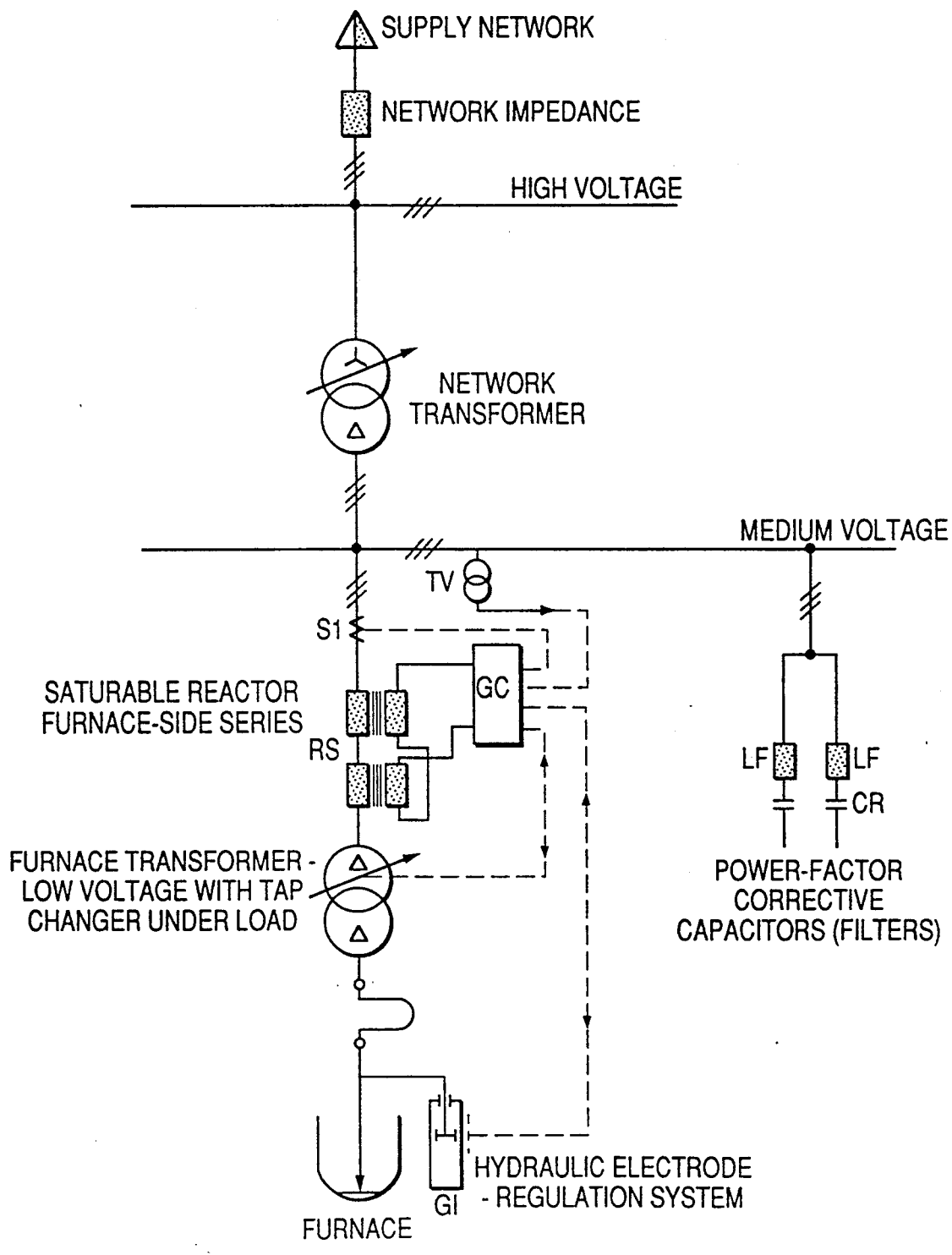

FIG. 4 shows a variant that provides for use of the saturable reactor Rs instead of L1, L2 and T.

The saturable reactor, excited by a suitable, constant direct current supplied by the control circuit GC, has the characteristic of providing a low reactance value for small values of current, lower than the nominal current $I_N$ of the furnace, and a high reactance value at higher current.

In this way is obtained the effect of restricting considerably the extent of overcurrents and therefore of voltage flicker.

This solution has the merit of not requiring a complicated control system GC; in fact, when the direct current corresponding to the IN of the operating point of the furnace has been set, the saturable reactor limits the overcurrents automatically.

The control circuit GC fixes the current of excitation of the saturable reactor according to the operating point of the furnace.

To obtain this function, the regulator GC is interfaced with the regulator of the height of the electrodes GI and with the tap changer of voltage under load of the furnace transformer.

According to a variant the regulator GC not only makes reference to signals coming from the regulator GI but also analyses the state of the electrical magnitudes involved at various points in the plant.

We claim:

1. A method for feeding a controlled current to a three-phase direct-arc electric furnace for smelting of metals, said furnace comprising means for geometric regulation of a height of electrodes, said method comprising:

feeding current to said furnace through a mains supply which includes at least one medium voltage line, a furnace transformer, and means for regulating arc current in each phase in a segment connecting said medium voltage line and said furnace transformer including at least a first inductor and a device to measure a magnitude of current drawn by the arc; and varying a series reactance of said segment in response to measurements from said device for measuring a magnitude of current drawn by the arc.

2. A method as claimed in claim 1, in which a value of the series reactance is varied by varying an inductance of a second inductor controlled by thyristors arranged in parallel to the first inductor.

3. Method as claimed in claim 1, in which an overall value of an equivalent series reactance is varied by bypassing the first inductor by means of thyristors.

4. A method as claimed in claim 1, in which a value of the series reactance is varied in steps by activating intermediate tappings branched from said first inductor by means of thyristors.

5. A method of feeding a controlled current to a three-phase direct-arc electric furnace for smelting of metals, said furnace comprising means for geometric regulation of a height of electrodes, said method comprising:

feeding current to said furnace through a mains supply which includes a power supply network, at least one medium voltage line, a furnace transformer, and means for regulating an arc current in each phase in a segment connecting said medium voltage line and said furnace transformer including a saturable reactor in series between said medium voltage line and said furnace transformer; and varying a reactance of said saturable reactor based on a magnitude of current drawn by the arc.

6. A three-phase direct-arc electric furnace fed with controlled current, comprising:
electrodes;
means for regulating a height of electrodes to control a length of an arc produced thereby;
a mains supply including at least one medium voltage line and a furnace transformer to supply current to the furnace, a segment of said mains supply connecting said medium voltage line and said furnace transformer including at least one first inductor and a device to measure a magnitude of current drawn by the arc; and
a thyristor-controlled valve provided in parallel with the at least one first inductor for varying a series reactance of said segment.

7. An electric furnace as claimed in claim 6, further comprising a second inductor in series with the thyristor-controlled valve, said thyristor controlled valve and said second inductor being in parallel with said first inductor.

8. An electric furnace as claimed in claim 6, in which the thyristor-controlled valve is governed by a control circuit.

9. An electric furnace as claimed in claim 8, in which the control circuit processes signals of at least said thyristor controlled valve to measure the magnitude of current drawn by the arc.

10. An electric furnace as claimed in claim 8, in which the control circuit is connected to a tap changer of the furnace.

11. An electric furnace as claimed in claim 8, in which the control assembly processes signals representing a position of said electrodes.

12. A three-phase direct-arc electric furnace fed with controlled current, comprising:
electrodes;
means for regulating a height of electrodes to control a length of an arc produced thereby;
mains supply including a power supply network, at least one medium voltage line and a furnace transformer to serve the furnace, a segment of said mains supply connecting said medium voltage line furnace and said furnace transformer including a saturable reactor in series between said medium voltage line and said furnace transformer and a device to measure a magnitude of current absorbed by the arc; and
means for controlling a reactance of said saturable reactor based on a magnitude of current drawn by the arc.

* * * * *